US00RE42990E

(19) United States
(12) Reissued Patent
Tanaka

(10) Patent Number: US RE42,990 E
(45) Date of Reissued Patent: Dec. 6, 2011

(54) ALTERNATOR PULLEY

(75) Inventor: Yasuhito Tanaka, Nara (JP)

(73) Assignee: JTEKT Corporation, Osaka (JP)

(21) Appl. No.: 10/201,948

(22) Filed: Jul. 25, 2002

Related U.S. Patent Documents

Reissue of:
(64) Patent No.: 6,093,991
Issued: Jul. 25, 2000
Appl. No.: 09/010,124
Filed: Jan. 21, 1998

(30) Foreign Application Priority Data

Apr. 9, 1997 (JP) ..... 9-90558

(51) Int. Cl.
*H02K 7/10* (2006.01)
*F16D 3/34* (2006.01)

(52) U.S. Cl. ..... 310/100; 192/45

(58) Field of Classification Search ..... 310/100; 192/41 R, 41 A, 45
See application file for complete search history.

(56) References Cited

U.S. PATENT DOCUMENTS 4,770,054 A * 9/1988 Ha ..... 74/409
4,821,856 A * 4/1989 Lederman ..... 192/45
5,010,994 A * 4/1991 Heireth et al. ..... 192/103 B
5,052,982 A * 10/1991 Ouchi ..... 474/135
5,393,266 A * 2/1995 Braun et al. ..... 464/67
5,398,791 A * 3/1995 Tombers et al. ..... 192/45
5,575,366 A * 11/1996 Zenmei et al. ..... 192/45
5,638,931 A * 6/1997 Kerr ..... 192/45
5,675,202 A * 10/1997 Zenmei et al. ..... 310/100
5,695,031 A * 12/1997 Kurita et al. ..... 192/45
5,740,893 A * 4/1998 Yamamoto ..... 192/45
5,827,143 A * 10/1998 Monahan et al. ..... 474/73
6,093,991 A * 7/2000 Tanaka ..... 310/100

FOREIGN PATENT DOCUMENTS

JP 57-17256 6/1955

* cited by examiner

*Primary Examiner* — Karl Tamai
(74) *Attorney, Agent, or Firm* — Birch, Stewart, Kolasch & Birch, LLP

(57) ABSTRACT

An alternator pulley includes a driving member driven and rotated via a belt from an output shaft of an engine. A driving member is disposed on an inner surface of the driving member and a one-way clutch is interposed between the driving and driven member. The one-way clutch includes rollers capable of rolling in a locked side direction along which a rotating power of the driving member is transmitted to the driven member or a free side direction along which the rotating powder is interrupted. Depending on a relative speed difference between the driving member and the driven member, the rollers are biased for pressing in the locked side direction and a torque value of the pressing is set preferably to less than 4 Nm.

8 Claims, 3 Drawing Sheets

ALTERNATOR PULLEY

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an alternator pulley equipped with a one-way clutch. This alternator pulley is driven by the engine's crankshaft of an automobile, for example, via a belt and causes an alternator to generate electricity.

2. Description of the Related Art

An engine's crankshaft does not rotate at a constant speed but varies according to the operating condition of the vehicle in which the engine's is mounted. An alternator directly driven by such an engine's crankshaft generates electric power at efficiency proportional to the engine's output power.

Another alternator has been devised as disclosed in Unexamined Japanese Utility Model Publication No. 57-17256. This alternator is fitted with a one-way clutch. When the rotational speed of the crankshaft drops, the rotation of the rotor of the alternator is continued by making use of its inertial force, thereby enhancing the power generation efficiency of the alternator. This enhances the efficiency at which the alternator generates electricity. This one-way clutch uses rollers and is of normal construction. As the rotational speed of the crankshaft varies, the one-way clutch is switched between a free state and a locked state. In the free state the power is not transmitted, whereas in the locked state the power is transmitted.

In the related art technique described above, if the load applied by a spring of the one-way clutch is set high, when the rotational speed of the crankshaft decreases, the rollers of the one-way clutch become difficult to roll from their locked positions to their free positions. Therefore, a switching operation for interrupting the power transmission becomes delayed and so it becomes impossible to maintain the rotation of the alternator rotor at high speed. As a result, the power generation efficiency deteriorates.

SUMMARY OF THE INVENTION

Accordingly, it is a main object of the present invention to provide an alternator pulley capable of stabilizing a power transmission and an interrupting operation by the one-way clutch, thereby improving the power generation efficiency of the alternator.

It is another object of the present invention to provide an alternator pulley wherein it is made possible to quickly carry out a switching operation from a transmission to an interruption of the rotational power by the one-way clutch at high engine rotational speed, thereby improving the power generation efficiency of the alternator.

Other objects, features and advantages of the present invention will be apparent from the recitations mentioned below.

The above-described objects are achieved by an alternator pulley in accordance with the present invention, comprising: an annular driving member connected to an output shaft of an engine via a belt; a driven member disposed on an inner surface of the annular driving member with its center of rotation being substantially coincident with that of the driving member; and a one-way clutch disposed between the inner surface of the annular driving member and an outer surface of the driven member; wherein the one-way clutch includes rollers capable of rolling in a locked side direction along which a rotating power of the driving member is transmitted to the driven member or a free side direction along which the rotating power is interrupted, depending on a relative speed difference between the driving member and the driven member; and it is set in such a manner that the rollers are pressed in the locked side direction at a torque value of less than a given value, preferably a torque value of less than 4 N·m.

In one preferred embodiment of the present invention, the one-way clutch comprises: an inner race whose inner surface is disposed on an outer surface of the driven member and whose outer surface is provided with a plurality of cam surfaces; a plurality of rollers; and a retainer disposed between the driving member and the driven member and having a plurality of pockets receiving the rollers, respectively, such that the rollers can come into contact with the inner surface of the driving member and with the cam surfaces; wherein spaces of the pockets are defined by the cam surfaces and the inner surface of the driving member in such a manner that the spaces become narrower in the locked side and wider in the free side, and the rollers roll in the pockets toward the locked side or the free side, depending on a relative speed difference between the driving member and the driven member.

In another preferred embodiment of the present invention, the one-way clutch comprises pressing members for pressing the rollers toward the locked side direction, and the torque value is a value obtained by multiplying a radius taken from an axis of the inner race to each of the pressing members and a pressing force of the pressing member.

In a further preferred embodiment of the present invention, the pressing members are resilient members which are received in recesses continuous with the pockets, respectively, and which press the rollers toward the locked side direction, respectively.

In a yet further preferred embodiment of the present invention, the resilient members are disposed in positions where they press inner sides of the rollers toward the locked side direction.

The one-way clutch in accordance with the present invention is switched between a locked state and a free state, depending on variation in output power of the engine, so that power is connected or disconnected from the driving member to the driven member, thereby enhancing the power generation efficiency of the alternator.

In one feature of the present invention, since the force for locking the rollers in the locked side is appropriately controlled, the rollers are rapidly rolled from their locked positions to their unlocked positions and so the switching to the free state can be carried out within a short period after the rotational speed of the belt has started to be decreased and, as a result, the rotation of the rotor of the alternator can be maintained at high speed.

Further, in the event that the cam surfaces of the one-way clutch are provided in the inner race side, the rollers can be prevented from moving unnecessarily out of their locked positions due to centrifugal force even at high rotational speed region of the engine.

BRIEF DESCRIPTION OF THE DRAWINGS

These and other objects as well as advantages of the present invention will become clear by the following description of preferred embodiment of the present invention with reference to the accompanying drawings, wherein like components are indicated by the same numerals and wherein.

DETAILED DESCRIPTION OF THE INVENTION

Figure 1:
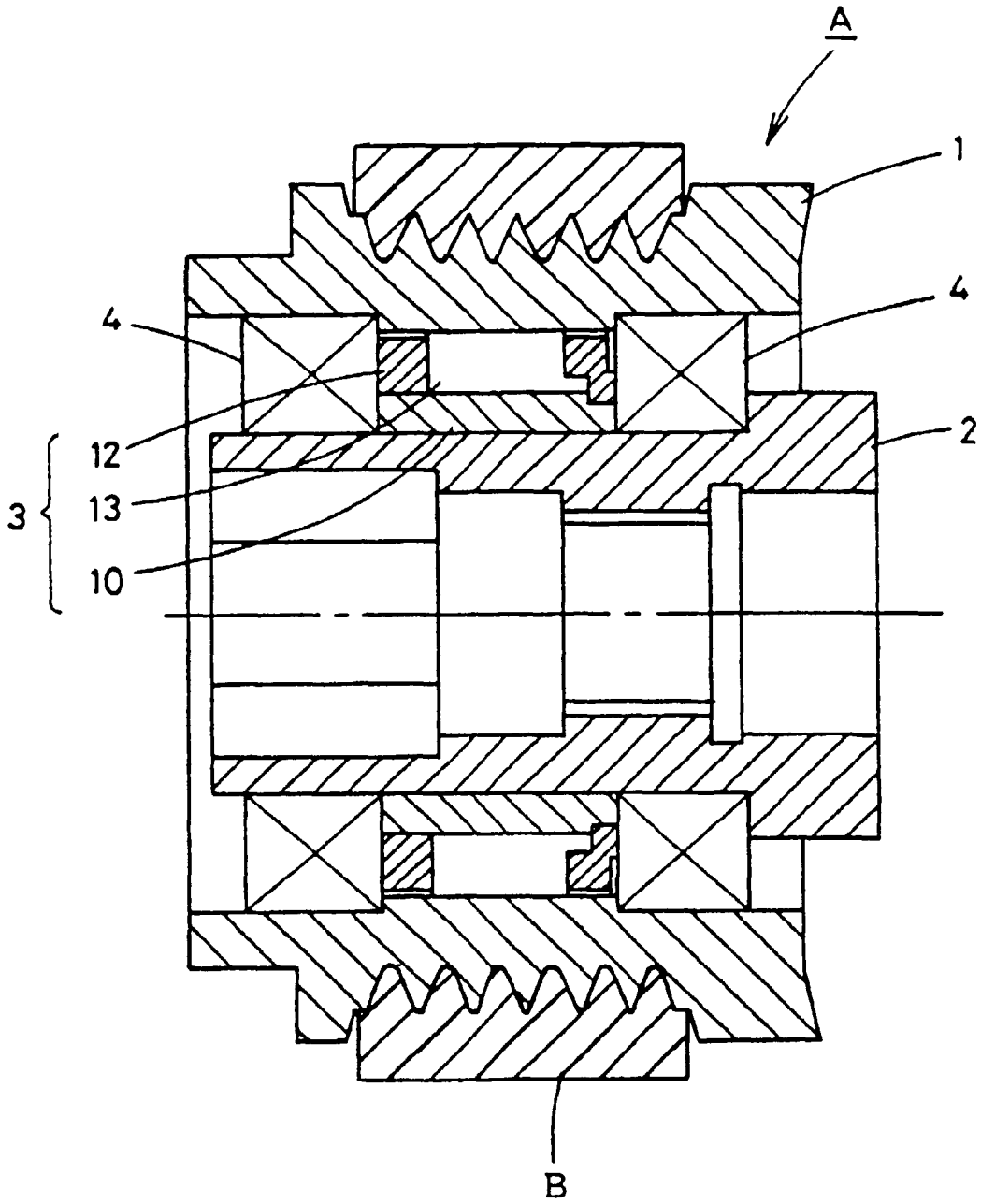
FIG. 1 is a vertical-sectional view of an alternator pulley according to a preferred embodiment of the present invention.
Figure 2:
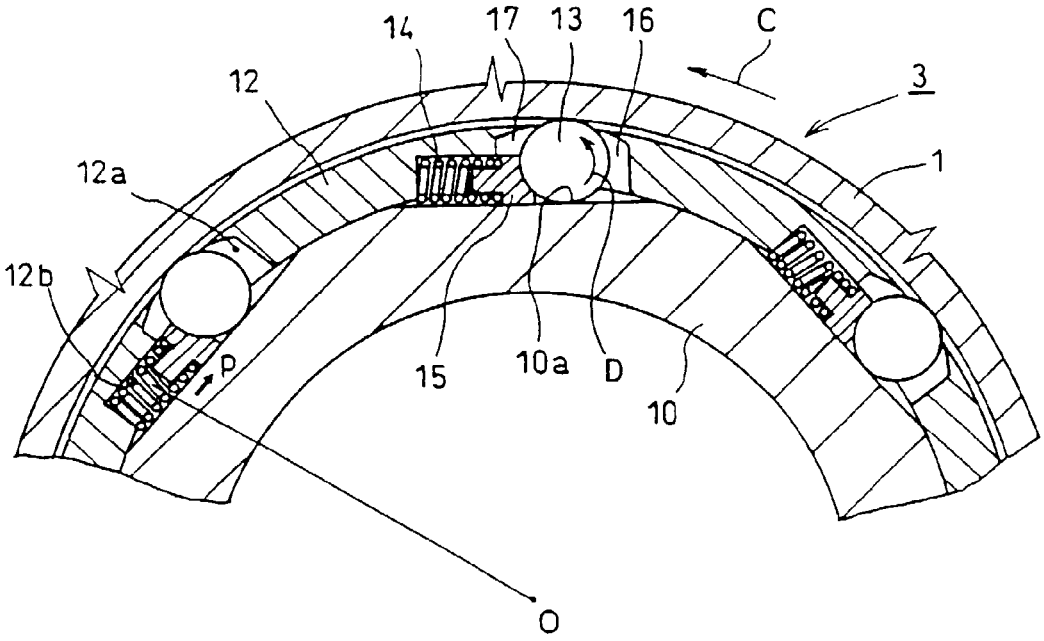
FIG. 2 is a sectional view taken along line (2)-(2) of FIG. 1 and showing only a one-way clutch.
Figure 3:
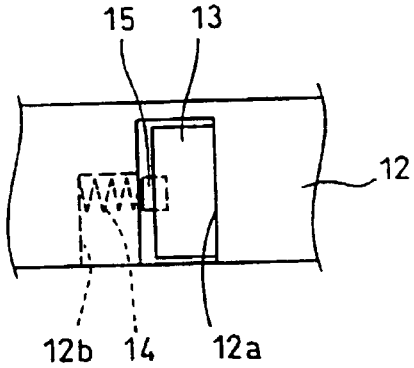
FIG. 3 is a fragmentary developed plan view of the one-way clutch shown in FIG. 2.
Figure 4:
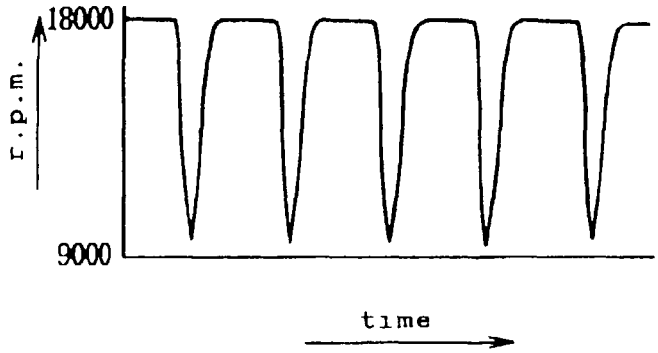
FIG. 4(a) is a diagram illustrating the rotational characteristics of a driving member and a driven member represented by an alternator pulley having no one-way clutch when the rotational speed of engine is decreased.
FIG. 4(b) is a diagram corresponding to FIG. 4(a), but represented by an alternator pulley which is provided with a one-way clutch and whose torque value exceeds 4.5 N·m.
FIG. 4(c) is a diagram corresponding to FIG. 4(a), but represented by an alternator pulley according to a preferred embodiment of the present invention, which is provided with a one-way clutch and whose torque value is 4 N·m.
Figure 4:
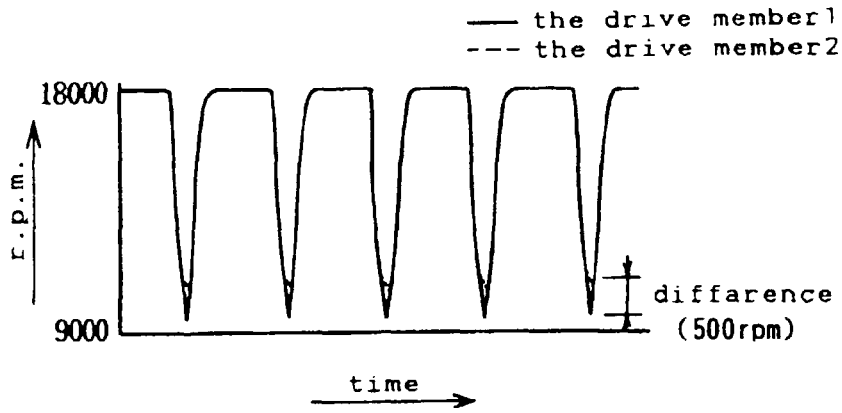
Figure 4:
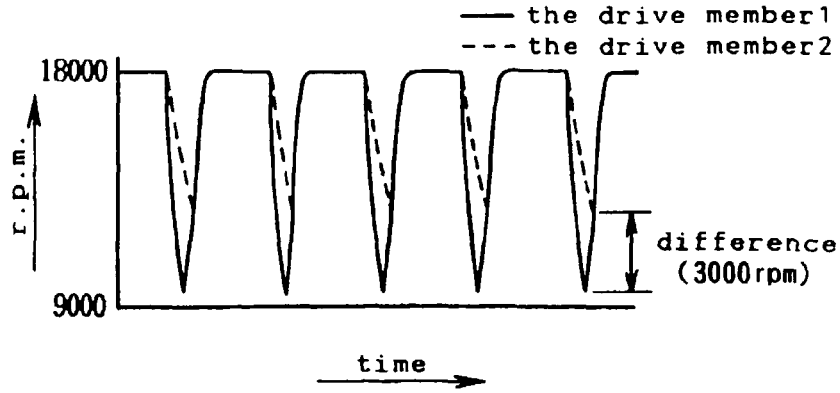

An alternator pulley according to a preferred embodiment of the present invention is described with reference to FIGS. 1-4.

This alternator pulley, generally indicated by A, comprises a driving member 1, a driven member 2, a one-way clutch 3, and rolling hearings 4. The driving member 1 assumes an annular shape in its radial section. A wavy groove is formed in the outer surface of the driving member 1. A belt B that is referred to as a V-belt runs in this groove. The driving member 1 is connected via the belt B to a crankshaft that is the output shaft of an automotive engine. The driven member 2 takes the form of a sleeve into which an alternator rotor (not shown) is securely mounted. The driven member 2 assumes a circular contour at least in radial section. This driven member 2 is disposed on the inner surface of the driving member 1 such that the center of rotation of the driven member 2 is coincident with that of the driving member 1. The one-way clutch 3 is disposed between the inner surface of the driving member 1 and the outer surface of the driven member 2. The rolling bearings 4 are mounted on axially opposite sides of the one-way clutch 3 between the driving member 1 and the driven member 2 to seal the one-way clutch 3. The rolling bearings 4 consist of deep groove ball bearings each fitted with a seal member at an axially outer side.

The one-way clutch 3 is constructed as follows. This clutch 3 comprises an inner race 10, a retainer 12, plural rollers 13, plural coil springs 14, and plural spring receiving members 15. The inner race 10 has several flat, key-shaped cam surfaces 10a on its outer surface. The cam surfaces 10a are circumferentially spaced from each other. The inner surface of the inner race 10 is fixedly attached to the outer surface of the driven member 2. The retainer 12 has plural pockets 12a extending radially therethrough in conformity with the cam surfaces 10a. Each one roller 13 is received in each pocket 12a of the retainer 12. The coil springs 14 are received in their respective recesses 12b continuous with the pockets 12a and act to press the rollers 13 to wedge-shaped narrower sides or locked sides 16 between the cam surfaces 10a and the inner surface of the driving member 1. The coil springs 14 are offset toward the inner race 10, i.e., inwardly, so that the resilient biasing forces of the springs 14 assist the rotation of the rollers 13 about their respective centers and that the biasing forces are efficiently applied to the rollers in a well balanced manner. The springs 14 bear against the axial centers of the rollers 13, respectively. Each bearing receiving member 15 engages one end of a respective one of the coil springs 14 and bears against the peripheral surface of the roller 13.

The wider side 17 of each wedge-shaped space between the cam surface 10a and the inner surface of the driving member 1 becomes a free side 17 with respect to the locked side 16.

The pulley A described above increases the power generation efficiency of the alternator as high as possible if the rotational speed of the belt B is varied due to the one-way clutch 3. That is, generally the rotational speed of the crankshaft of the engine which becomes a driving source of the belt B varies irregularly according to the operating condition. When the rotational speed of the belt B increases, the one-way clutch 3 becomes a locked state. This causes the driven member 2 to be rotated in synchronism with the driving member 1. On the other hand, when the rotational speed of the belt B decreases, the one-way clutch 3 enters a free state, and the driven member 2 continues its rotation by its own inertial force, irrespective of deceleration of the driving member 1. In this way, the rotation of the alternator rotor is kept at high speed. Consequently, the power generation efficiency is enhanced.

More specifically, the rollers 13 are offset toward the inner race 10 and kept biased toward the locked sides 16 by the coil springs 14. Therefore, the rollers 13 are in contact with the inner surface of the driving member 1. Thus, when the driving member 1 is rotated in the direction indicated by the arrow C in FIG. 2, the driving member 1 applies such a force to the rollers 13 as to rotate them about their own axes as indicated by the arrow D.

When the rotational speeds of the belt B and the driving member 1 are higher relatively than that of the driven member 2, the rollers 13 of the one-way clutch 3 are in contact with the inner surface of the driving member 1 and with the cam surfaces 10a of the inner race 10. The rollers 13 rotate about their own axes as indicated by the arrow D. As a result, the rollers 13 are caused to roll into the narrower sides or the locked sides 16 of the wedges-shaped spaces, while assisted by the pushing force of the coil springs 14. Then the cam surfaces 10a of the inner race 10 and the inner surface of the driving member 1 are locked together via the rollers 13. Since the inner race 10 is locked to the driven member 2, rotating power of the driving member 1 is transmitted to the driven member 2, so that a locked state is brought about and the driven member 2 rotates in synchronism with the driving member 1.

On the other hand, when the rotational speeds of the belt B and the driving member 1 are lower than that of the driven member 2, a situation opposite to the foregoing takes place. The rollers 13 in the one-way clutch 3 roll into the wider sides 17 of the wedge-shaped spaces while resisting against the pushing force of the coil springs 14 that biases the rollers toward the locked sides 16. Then the cam surfaces 10a of the inner race 10 are unlocked from the inner surface of the driving member 1, so that the rotating power of the driving member 1 is not transmitted to the driven member 2. That is, the driven member 2 enters into a free state and, as a result, it continues its rotation only by its own inertial force.

Here, according to the present invention, in the one-way clutch 3 when the rotational speed of the driving member 1 becomes lower relatively than that of the driven member 2 and thus the power transmission is interrupted, the rollers 13 are allowed to roll from the locked positions to the free positions in order to eliminate delay in the switching operation. For this purpose, a value of the torque by the coil spring 14 that pushes the roller 13 toward the locked side 16 is set to less than 4 N·m, preferably within the range from 0.001 to 4 N·m. This torque value is obtained by calculating the product of a radius r, taken from an axis 0 of the driving member 1 to each coil spring 14, and a spring force p per one coil spring 14. By this means, in the one-way clutch 3 described above, the rollers 13 can quickly roll from the locked positions to the free positions. Therefore, the rollers can be rapidly switched to the free state after the rotational speed of the belt B is started to be decreased. Hence, the rotation of the alternator rotor can be maintained at high speed. Another feature of the present embodiment is that the cam surfaces 10a of the one-way clutch 3 are located on the side of the inner race 10 rather than on the side of the driving member 1. This prevents the rollers 13 from moving unnecessarily out of their locked positions due to centrifugal force even at high rotational speed region.

Since the relations of the amount of variation in the rotational speed of the alternator with respect to the amount of variation in the rotational speed of the belt B have been studied, they are explained below. FIGS. 4(a), 4(b), and 4(c) are diagrams illustrating such relations about some alternator pulleys.

FIG. 4(a) shows data derived from an alternator pulley fitted with no one-way clutch 3. It can be seen that variations in the engine rotational speed are directly transmitted to the alternator rotor.

FIG. 4(b) shows data derived from an alternator pulley having a built-in one-way clutch. The torque value was set to 4.5 N·m. It can be seen that when the engine rotational speed, or the rotational speed of the driving member 1, was lowered from 18,000 rpm to 9,000 rpm, the rotational speed of the driven member 2, i.e., the rotational speed of the alternator rotor became 9,500 rpm, and thus the power generation efficiency was slightly improved.

FIG. 4(c) shows data derived from an alternator pulley having a built-in one-way clutch. The torque was set to 4 N·m. It can be seen that when the engine rotational speed, or the rotational speed of the driving member 1, was lowered from 18,000 rpm to 9,000 rpm, the rotational speed of the driven member 2, i.e., the rotational speed of the alternator rotor became 12,000 rpm, and thus the power generation efficiency was greatly improved.

The measurements in FIGS. 4(b) and 4(c) were carried out with bench test equipment, using a pulley having a diameter of 56 mm under a condition of acceleration for 1 second and deceleration for 15 seconds.

In this way, in the event that the torque of the one-way clutch 3 exceeds 4 N·m, if the rotational speed of the belt B drops, the rollers 13 do not readily roll from their locked positions to their free positions and so if follows that a switching operation for interrupting the power transmission becomes delayed. Consequently, this construction is similar in utility to the alternator pulley fitted with no one-way clutch and so no great advantages are obtained. On the other hand, the minimum optimum torque value is 0.001 N·m. If the torque value further approaches 0, the assisting biasing force when the rollers 13 roll from their free sides to their locked sides becomes insufficient, so that the function intrinsic in the one-way clutch 3 becomes deteriorated. Based on these findings, a suitable range of the torque value is specified as mentioned above.

By the way, the present invention is not limited only to the above-described embodiment but various applications and modifications are conceivable.

(1) In the above-described embodiment, although in the one-way clutch 3 a resilient member such as the coil spring 14 is exemplified a a pressing member for pressing the roller 13 in the locked side direction, it is possible to use various leaf spring and resilient piece or the like as the resilient member other than the coil spring 14.

(2) Although in the above-described embodiment the example wherein the cam surface 10a of the one-way clutch 3 is formed in the inner race member side is exemplified, the present invention can be applied also to an example wherein the cam surface is provided in an outer race member side or the driving member side.

While there has been described what is at present considered to be the preferred embodiment of the present invention, it will be understood that various modifications may be made therein, and it is intended to cover in the appended claims all such modifications as fall within the true spirit and scope of the present invention.

What is claimed is:

1. An alternator pulley comprising:

an annular driving member having an inner side and an outer side, said annular driving member having a first center of rotation, said driving member having a first rotation speed and a second rotation speed, said first rotation speed being substantially greater than said second rotation speed;

a belt disposed on said outer side of said driving member;

a driven member disposed on said inner side of said driving member, said driven member having an inner surface and an outer surface, said driven member having a second center of rotation, said first center of rotation being substantially coincident with said second center of rotation; and a one-way clutch being disposed between said inner side of said driving member and said outer surface of said driven member, said one-way clutch including:

an inner race being disposed on an outer surface of said driven member, said inner race having an inner side and an outer side, said inner side of said inner race contacting said outer surface of said driven member, said outer side of said inner race including a plurality of cam surfaces;

a retainer disposed between said outer surface of said inner race and said inner side of said driving member, said retainer including a plurality of pockets, each pocket including a first wedge-shaped side and a second wedge-shaped side, each first wedge-shaped side being substantially wider than each second wedge-shaped side, each wedge-shaped side defining a wedge element, each wedge element having a first surface disposed within a respective pocket and a second annular surface adjacent to said inner side of said driving member;

a plurality of pressing members, each pocket including a pressing member, each pressing member disposed adjacent to a respective first wedge-shaped side of a pocket; and a plurality of rollers, each pocket including a roller biased by a respective pressing member, said rollers being in one of a locked state and a free flowing state, said locked state occurring when a respective pressing member biases a respective roller against a respective second wedge-shaped side of a pocket, said free flowing state occurring when a respective pressing member biases a respective roller against a respective first wedge-shaped side of a pocket, whereby during said first rotation speed, each roller is in said locked state, and during said second rotation speed, each roller is in said free flowing state and said driven member continues rotation due to inertia and said rollers which in turn substantially increases power generation efficiency during said second rotation speed.

2. The alternator pulley of claim 1, wherein each pressing member has a torque value, each torque value is less than 4 N·m.

3. The alternator pulley of claim 1, each pressing member has a torque value, each torque value is a value obtained by multiplying a radius taken from an axis of said inner race to each of said pressing members by a pressing force of said pressing member.

4. The alternator pulley of claim 3, wherein said pressing members are resilient members which are received in recesses continuous with said pockets, respectively, and which press said rollers toward said locked side direction, respectively.

5. The alternator pulley of claim 4, wherein said resilient members are disposed in positions where they press inner sides of said rollers toward said locked side direction.

6. The alternator pulley of claim 5, further comprising receiving members each of which is engaged with one end of each of said resilient members and bears against each of peripheral surfaces of said rollers.

7. The alternator pulley of claim 1, further comprising rolling bearings mounted on axially opposite sides of said one-way clutch between said driving member and said driven member.

*8. The alternator pulley of claim 1, wherein an outer side of a respective pressing member contacts a middle portion of a corresponding roller such that the pressing members bear against axial centers of the rollers.*

* * * * *